US005684077A

United States Patent [19]

Tracey et al.

[11] Patent Number: 5,684,077
[45] Date of Patent: Nov. 4, 1997

[54] COMPOSITION FOR MOLD CURING ELEMENTS

[75] Inventors: Donald Sheley Tracey, Howell; Irwin Jerome Gardner, Scotch Plains, both of N.J.; Bernard Jean Costemalle, Genese, Belgium

[73] Assignee: Exxon Chemical Patents Inc., Houston, Tex.

[21] Appl. No.: 439,715

[22] Filed: May 12, 1995

Related U.S. Application Data

[63] Continuation of Ser. No. 222,510, Apr. 4, 1994, abandoned, which is a continuation of Ser. No. 984,002, Dec. 1, 1992, abandoned, which is a continuation of Ser. No. 673,046, Mar. 21, 1991, abandoned.

[51] Int. Cl.$^6$ ............................................. C08L 27/00
[52] U.S. Cl. .................. 524/423; 524/424; 524/425; 524/430; 524/437; 524/445; 524/495; 524/569; 524/574; 428/36.8
[58] Field of Search ............................ 524/423, 424, 524/425, 430, 437, 445, 495, 569, 574; 428/36.8

[56] References Cited

U.S. PATENT DOCUMENTS

| | | | |
|---|---|---|---|
| 2,698,041 | 12/1954 | Morrissey et al. | 152/349 |
| 2,964,489 | 12/1960 | Baldwin et al. | 260/41.5 |
| 5,013,793 | 5/1991 | Wang et al. | 525/195 |
| 5,051,477 | 9/1991 | Yu et al. | 525/194 |
| 5,063,268 | 11/1991 | Young | 524/286 |
| 5,333,662 | 8/1994 | Costemalle et al. | 152/510 |

FOREIGN PATENT DOCUMENTS

| | | |
|---|---|---|
| 0344021 | 11/1989 | European Pat. Off. |
| 0363208 | 4/1990 | European Pat. Off. |
| WO91/13102 | 9/1991 | European Pat. Off. |

Primary Examiner—Joseph L. Schofer
Assistant Examiner—John J. Guarriello
Attorney, Agent, or Firm—Myron B. Kurtzman; John E. Schneider

[57] ABSTRACT

A composition suitable for use in producing mold curing elements is provided. The composition comprises a halogen-containing copolymer of a $C_4$ to $C_7$ isomonoolefin and a para-alkylstyrene; a filler such as carbon black, a process oil, and a curing agent. A curing element comprising the composition is also provided.

17 Claims, No Drawings

COMPOSITION FOR MOLD CURING ELEMENTS

This is a continuation of application Ser. No. 08/222,510, filed Apr. 4, 1994, which is a continuation of application Ser. No. 07/984,002, filed Dec. 1, 1992, which is a continuation of application Ser. No. 07/673,046, filed Mar. 21, 1991 now abandoned.

BACKGROUND OF THE INVENTION

1. Field of the Invention

The present invention relates to a composition suitable for use in devices used to press an article to be molded against a mold during vulcanization, particularly in tire casing curing elements; and curing elements comprising the composition.

2. Description of Information Disclosures

The use of halogenated butyl rubber to produce a fluid-retaining member (e.g., curing bag, curing diaphragm or bladder) for pressing a material against a mold during vulcanization to form an article is known. See, for example, U.S. Pat. No. 2,698,041 and U.S. Pat. No. 2,964,489, the teachings of which are hereby incorporated by reference.

European patent application 89-310227.7 filed Oct. 5, 1989 (Publication No. 0363208 published Apr. 11, 1990) disclosed a halogenated butyl rubber containing a specified unsaturation and a low level of halogen and compositions containing the low halogen-content-butyl rubber. The compositions are suitable for use in curing elements.

The term "curing element" is used herein to refer to a fluid retaining device suitable for pressing a material against a mold during vulcanization of the material to form an article (e.g., a tire).

It has now been found that curing elements that are made from a composition comprising certain halogen-containing copolymers of a $C_4$ to $C_7$ isomonoolefin and a para-alkylstyrene have improved properties.

SUMMARY OF THE INVENTION

In accordance with the invention, there is provided a composition comprising: (1) a halogen-containing copolymer of a $C_4$ to $C_7$ isomonoolefin and a para-alkylstyrene; (2) a filler; (3) a process oil; and (4) a curing agent.

In accordance with the invention, there is also provided a vulcanized curing element at least a portion thereof being derived from a composition comprising: (1) a halogen-containing copolymer of a $C_4$ to $C_7$ isomonoolefin and a para-alkylstyrene; (2) a filler; and (3) a process oil.

DETAILED DESCRIPTION OF THE INVENTION

The curing element composition of the present invention comprises a halogen-containing copolymer of a $C_4$ to $C_7$ isomonoolefin and a para-alkylstyrene, a filler, a process oil and a curing agent with or without curing agent modifiers. Optionally, the composition may comprise other rubber compounding additives.

Suitable halogen-containing copolymers of a $C_4$ to $C_7$ isomonoolefin and a para-alkylstyrene for use as a component of the present curing element composition comprise at least 0.5 weight percent of the para-alkyl-styrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from an effective amount above zero to about 7.5 weight percent, preferably from about 0.1 to about 7 weight percent. The halogen may be bromine, chlorine, and mixtures thereof. Preferably, the halogen is bromine. The major portion of the halogen is chemically bound to the alkyl group in the para position of the para-alkylstyrene, that is, the halogen-containing copolymer comprises para-halo alkyl groups.

The copolymers of the isomonoolefin and para-alkylstyrene useful to prepare the halogen-containing copolymers suitable as component of the curing element composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkyl styrene include copolymers having a number average molecular weight ($\overline{M}n$) of at least about 25,000, preferably at least about 30,000, more preferably at least about 100,000. The copolymers also, preferably, have a ratio of weight average molecular weight ($\overline{M}w$) to number average molecular weight ($\overline{M}n$), i.e., $\overline{M}w/\overline{M}n$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

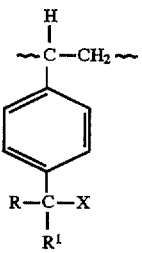

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkyl-styrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, metal-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is .possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/ isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, Or with the solvent or polymer (i.e., via hydrogen abstraction). The sensitizers referred to are those photo-chemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4-dimethyl-valero) nitrile, azo bis (2-methyl-butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

In addition to the halogen-containing copolymer of a $C_4$ to $C_7$ isomonoolefin and a para-alkylstyrene, the curing element composition of the present invention also comprises a filler, a process oil, and a curing agent. Optionally, the composition may comprise a rubber component of certain rubbers other than the halogen-containing copolymer of a $C_4$ to $C_7$ isomonoolefin and the para-alkylstyrene.

Suitable optional rubber components for the composition of the present invention, in addition to the halogen-containing copolymer of the isomonoolefin and the para-alkylstyrene, include rubbers selected from the group consisting of a copolymer of a $C_4$ to $C_7$ isomonoolefin and a $C_4$ to $C_{14}$ multiolefin, a halogenated copolymer of a $C_4$ to $C_7$ isomonoolefin and a $C_4$ to $C_{14}$ multiolefin, and mixtures thereof. These copolymers are generally referred to as butyl rubber and halobutyl rubber, respectively. The halobutyl rubber is typically a chlorobutyl rubber or a bromobutyl rubber.

Furthermore, the composition may, optionally, comprise one or more rubber compounding additives, such as antioxidants, antiozonants, stabilizers, pigments and mixtures thereof. The additive may be a fatty acid such as stearic acid.

The filler may be a non-reinforcing filler, an organic filler, an inorganic filler and mixtures thereof. Suitable fillers include talc, calcium carbonate, clay, silica, carbon black, titanium dioxide and mixtures thereof. Preferably, for non-white compositions, the preferred filler is carbon black. The carbon black may be derived from any source, such as channel blacks, furnace blacks, thermal blacks, acetylene black, lamp black and the like.

Suitable process oils include hydrocarbonaceous oils, organic esters, other synthetic plasticizers, certain oils derived from animal fats and certain oils derived from plants, such as castor oil, olive oil, corn oil, linseed oil and the like, and mixtures thereof. The preferred process oil is castor oil.

Optionally, the curing element composition of the present invention may comprise a rubber compounding additive.

Suitable rubber compounding additives include antioxidants, antiozonants, stabilizers, pigments, fatty acids and mixtures thereof. Suitable antioxidants include hindered phenols, amino-phenols, hydroquinones, alkyldiamines, amine condensation products, paraffin waxes, microcrystalline waxes, and mixtures thereof.

The curing element composition of the present invention also comprises a curing agent.

Suitable curing agents include sulfur cures and resin cures. The curing agent may comprise zinc oxide or zinc stearate or mixtures thereof. Optionally, curing agent modifiers, for example, accelerators and scorch retarders, may be used. Suitable modifiers include thiuram, dithiocarbamates, thioureas, thiazols, glycols, sulfur, and mixtures thereof. Zinc oxide-free cures may also be used, such as, for example, litharge, 2-mercaptoimidazoline, diphenyl guanidine and mixtures thereof.

The curing agent may be a resin cure such as, phenolic resins, brominated phenolic resins, resin, etc.

Suitable curing agents include resin cures such as those described in U.S. Pat. No. 3,287,440 and U.S. Pat. No. 4,059,651, the teachings of which are hereby incorporated by reference.

The preferred resin cures are phenol-formaldehyde resins in which are incorporated phenolmethylol groups, these products are known commercially and also include halogenated versions thereof. The generalized structure of the resin has been suggested as:

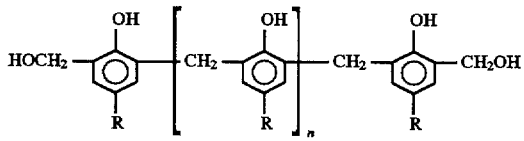

wherein R is an alkyl, aryl or alkenyl hydrocarbon containing 4 to 16 carbon atoms and n is about 0 to about 50; typically, the methylol groups are present at about 6 to about 12 weight percent. For the halogen-containing polymer of the present invention, a halogen activator is not required. The cure system additionally includes a metal oxide such as zinc oxide.

Halogenated resins in which some of the hydroxyl groups of the methylol group are replaced with, e.g., bromine, are more reactive. With such resins the use of additional halogen activator is not required.

The term "halogenated (phenol aldehyde) resin" as used in the description of the present invention is intended to mean both monomeric and polymeric halomethyl hydrocarbon-substituted phenols. The monomeric form of these curing agents falls under the general formula:

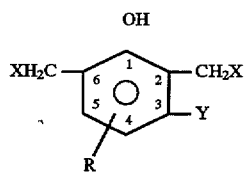

wherein R is an alkyl, aryl or alkenyl hydrocarbon containing 4 to 16 carbon atoms located in the meta or para positions (4–5 positions), X is a halogen such as fluorine, chlorine, bromine or iodine, and Y is hydrogen or hydroxy.

Products obtained by the controlled halogenation of methylol-containing resins prepared by the condensation of an aldehyde, e.g., formaldehyde, with the following representative phenols: 4-tertiary-butyl phenol, 4-phenyl phenol and 4-monoxy phenol, are within the purview of the halogenated phenol aldehyde resins suitable for use in this invention. These halomethyl hydrocarbons substituted phenol compounds and their preparation are fully described in U.S. Pat. Nos. 3,093,613 and 3,165,496 which are incorporated herein by reference.

Preferably, the halogenated phenol aldehyde resin is a bromomethyl alkylated phenol aldehyde resin having a methylol content of about 9–14% and a bromine content of about 3–9%. Illustrative of the halogenated phenol aldehyde resins are those prepared by Schenectady Chemicals, Inc. and identified as resins SP 1055® and SP 1056®. Such resins are heat reactive bromomethyl alkylated phenolic resins with a melting point of about 125° F. The SP 1055 resin has a methylol content of about 9 to about 12.5% and a bromine content of about 4%, whereas the SP 1056 resin has a methylol content of about 7.5 to about 11% and a bromine content of about 6%. Commercial forms of the nonhalogenated resins are available such as SP-1044® with a methylol content of about 7 to about 9.5% and SP-1045® with a methylol content of about 8 to about 11%.

The resin cure useful in the present invention typically includes zinc oxide as part of the curative package, generally at a concentration of about 2 to about 8 parts by weight per hundred of rubber (phr), preferably about 2 to about 5 phr, for example 5 phr. The curing resin itself is typically present at about 2 to about 15 phr, preferably about 3 to about 10 phr, most preferably about 4 to about 8 phr, for example at about 5 phr.

The curing element composition of the present invention may comprise the halogen-containing copolymer of a $C_4$ to $C_7$ isomonoolefin and a para-alkylstyrene in an amount ranging from about 80 to 100, preferably from about 95 to about 100 phr, the filler in an amount ranging from about 30 to about 120 phr, preferably from 40 to 60 phr if carbon black is the filler or preferably from 40 to 100 if the filler is not carbon black; the process oil in an amount ranging from about 1 to about 15, preferably from about 4 to about 10 phr, and the curing agent in an amount ranging from about 4 to 31, preferably from about 8 to 12 phr.

The term "per hundred parts of rubber" is intended herein to be based on the total hydrocarbon rubber content of the composition. Thus, if an optional additional rubber is present in the composition, the rubber in the expression "phr" is the sum of the additional rubber and the halogen-containing copolymer of a $C_4$ to $C_7$ isomonoolefin and a para-alkylstyrene.

The curing element composition of the present invention may be vulcanized by subjecting it to heat according to any conventional vulcanization process. Typically, the vulcanization is conducted at a temperature ranging from about 100° C. to about 250° C., preferably from about 150° C. to about 200° C., for a time period ranging from about 1 to about 150 minutes.

The composition of the present invention may be used in producing curing elements (i.e., devices) used to press a material to be molded against a mold during its vulcanization to make a molded article. It is particularly suitable for use in the production of tire casing curing elements, such as diaphragms, curing bladders, curing bags, etc., which must be heat resistant and are usually hollow fluid retaining flexible rubbery devices or articles.

Suitable curing element compositions may be prepared by using conventional mixing techniques including, e.g., kneading, roller milling, extruder mixing, internal mixing (such as with a Banbury® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the halogenated polymer, the filler and a process oil such as castor oil are added and the composition mixed for the desired time or to a particular temperature to achieve adequate dispersion of the ingredients. Alternatively, the rubber and a portion of the filler (e.g., one-third to two-thirds) is mixed for a short time (e.g., about 1 to 3 minutes) followed by the remainder of the filler and oil. Mixing is continued for about 5 to 10 minutes at high rotor speed during which time the mixed compound reaches a temperature of about 140° C. Following cooling, the compound is mixed with curatives in a second step to disperse the curatives at relatively low temperature, e.g., about 80° to about 120° C. Variations in mixing will be readily apparent to those skilled in the art and the present invention is not limited by the mixing procedure. The mixing is performed to disperse all components of the composition thoroughly and uniformly.

Vulcanization of a molded article, for example a curing element, is carried out in heated presses under conditions well known to those skilled in the art. It is preferred that vulcanization be effected at temperatures of about 140° to about 250° C. and for periods of about 5 to about 60 minutes. Curing time will be affected by the thickness of the article and the concentration and type of curing agent as well as the halogen content of the halogenated polymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084.

The following examples are presented to illustrate the invention.

COMPARATIVE EXAMPLES 1 AND 2

Composition 1, which is not a composition in accordance with the present invention, was prepared as follows using a laboratory Banbury mixer: a butyl rubber Exxon grade 268 (Exxon Chemical Company) and polychloroprene (Neoprene W, trademark name of E.I. Dupont Company) were preblended in the Banbury to improve dispersion. The Banbury mixing was conducted as follows: After 1.5 minutes of preblending the Exxon Butyl 268 and Neoprene W, the carbon black and oil were added. Mixing was continued until a temperature of 150°–160° C. was recorded. After reducing the temperature of the mixture, the curing agent was added to the mixed composition on a rubber mill. The components of the composition are shown in Table I.

Composition 2, which is not a composition in accordance with the present invention, was prepared substantially by the same procedure as given for Composition 1 except that since polychloroprene was omitted from the formulation, the preblending step contained only the chlorinated copolymer of isobutylene and isoprene. The components of the composition are shown in Table I.

EXAMPLES 3, 4, AND 5

Compositions 3, 4, and 5, which are compositions in accordance with the present invention, were prepared substantially by the same procedure as given in the Comparative Example with Composition 2.

TABLE I

|  | Composition 1 | Composition 2 | Composition 3 | Composition 4 | Composition 5 |
| --- | --- | --- | --- | --- | --- |
| Polymer A[1] | 100 | none | none | none | none |
| Polymer B[2] | none | 100 | none | none | none |
| Polymer C[3] | none | none | 100 | 100 | 100 |
| Polychloroprene | 5.00 | none | none | none | none |
| Carbon black | 55.00 | 55.00 | 55.00 | 55.00 | 55.00 |
| Castor oil | 5.00 | 5.00 | 5.00 | 5.00 | 5.00 |
| Zinc Oxide | 5.00 | 5.00 | 5.00 | 2.00 | 2.00 |
| SP1045[4] | 10.00 | 10.00 | 10.00 | 5.00 | 5.00 |
| Stearic Acid | none | none | none | 1.00 | 1.00 |
| Sulfur | none | none | none | 1.00 | 1.00 |
| MBTS[5] | none | none | none | 2.00 | 2.00 |
| TEG[6] | none | none | none | none | 0.66 |

Footnotes:
[1]Polymer A was Exxon butyl rubber grade 268 (Exxon Chemical Company)
[2]Polymer B was a chlorinated copolymer of isobutylene and isoprene comprising 0.35 wt. % chlorine.
[3]Polymer C was a brominated copolymer of isobutylene and para-methylstyrene comprising 5 wt. % para-methylstyrene and 0.8 wt. % bromine
[4]SP1045 was alkyl phenol-formaldehyde resin of Schenectady Chemical Company
[5]MBTS denotes 2,2'-dibenzothiazyl disulfide
[6]TEG denotes triethylene glycol The physical properties of these compositions are shown in Table II.

TABLE II

|  | Composition | | | | |
|---|---|---|---|---|---|
|  | 1 | 2 | 3 | 4 | 5 |
| Rheometer @ 190° C. 3° Arc | | | | | |
| $M_L$ (lb-in) | 14 | 12 | 18 | 16 | 14 |
| $M_H$ (lb-in) | 45 | 42 | 51 | 38 | 34 |
| Ts2 (min) | 2.5 | 2.0 | 2.5 | 2.0 | 2.3 |
| Tc90 (min) | 19.5 | 15.0 | 22.5 | 5.0 | 36.5 |
| Cure Tc90 @ 190° C. | | | | | |
| Tensile, MPa | 13.5 | 15.9 | 16.1 | 14.7 | 13.6 |
| 300% Modulus, MPa | 5.4 | 7.4 | 8.1 | 2.5 | 2.5 |
| % Elongation | 680 | 600 | 560 | 980 | 950 |
| 300% Tension Set % | 12.4 | 6.2 | 9.3 | 12.4 | 9.3 |
| Shore A | 76 | 66 | 73 | 57 | 57 |
| Cure Tc90 @ 190° C. | | | | | |
| Tensile, MPa Aged 24 hrs @ 177° C. | 7.1 | 11.3 | 14.1 | 10.5 | 9.8 |
| 300% Modulus, MPa | 6.7 | 8.4 | 12.6 | 6.2 | 5.8 |
| % Elongation | 330 | 430 | 340 | 490 | 530 |
| 300% Tension Set % | 37.4 | 15.6 | 15.6 | 18.7 | 21.8 |
| Shore A | 86 | 77 | 76 | 82 | 77 |

What is claimed:

1. A hollow, fluid retaining curing element used for pressing a vulcanizable material against a mold during vulcanization of said material, said curing element comprising a vulcanized mixture of:
   1. 80 to 100 phr of a halogen-containing copolymer of a $C_4$ to $C_7$ isomonoolefin and para-alkylstyrene having about 0.8 weight percent halogen content;
   2. 30 to about 120 phr of a filler;
   3. 1 to about 15 phr of a processing oil; and
   4 to about 3 1 phr of a curing agent.

2. The curing element of claim 1, wherein said filler is selected from the group consisting of talc, calcium carbonate, clay, silica, carbon black, titanium dioxide, and mixtures thereof.

3. The curing element of claim 1, wherein said filler comprises carbon black.

4. The curing element of claim 1, additionally comprising a rubber compounding additive.

5. The curing element of claim 1, wherein said copolymer comprises from about 0.5 to about 20 weight percent of said para-alkylstyrene.

6. The curing element of claim 1, wherein said halogen is selected from the group consisting of chlorine, bromine, and mixtures thereof.

7. The curing element of claim 1, wherein said halogen comprises bromine.

8. The curing element of claim 1, wherein said isomonoolefin is isobutylene and said para-alkylstyrene is para-methylstyrene.

9. The curing element of claim 1 wherein said process oil is castor oil.

10. The curing element of claim 1 wherein said curing agent comprises a zinc compound selected from the group consisting of zinc oxide, zinc stearate and mixtures thereof; a phenolic resin, and a curing agent modifier.

11. The curing element of claim 10, wherein said phenolic resin is a phenol-formaldehyde resin comprising phenolmethylol groups.

12. The curing element of claim 10, wherein said curing agent modifier is selected from the group consisting of sulfur, thiuram, a dithiocarbamate, a thiourea, a thiazole, a glycol and mixtures thereof.

13. The curing element of claim 1 consisting of 100 phr of the halogen-containing copolymer of a $C_4$ to $C_7$ isomonoolefin and a para-alkylstyrene.

14. The vulcanized curing element of claim 1, wherein said curing element is a tire curing element.

15. The vulcanized curing element of claim 14, wherein said tire curing element is selected from the group consisting of a curing bag, a curing bladder, and a curing diaphragm.

16. The curing element of claim 1 which further contains a rubber selected from the group consisting of a copolymer of a $C_4$ to $C_7$ isomonoolefin and a $C_4$ to $C_{14}$ multiolefin, a halogenated copolymer of a $C_4$ to $C_7$ isomonoolefin and a $C_4$ to $C_{14}$ multiolefin and mixtures thereof, said rubber present in said mixture at a level of less than 20 phr.

17. The curing element of claim 16 wherein said rubber is a chloro-or bromobutyl rubber.

* * * * *